US00RE35519E

United States Patent [19]

Winkens

[11] E Patent Number: Re. 35,519

[45] Reissued Date of Patent: May 27, 1997

[54] METHOD AND APPARATUS FOR SMOOTH-ROLLING AND DEEP-ROLLING MULTI-STROKE CRANKSHAFTS

[75] Inventor: Rudolf Winkens, Erkelenz-Gerderath, Germany

[73] Assignee: Wilhelm Hegenscheidt GmbH, Erkelenz, Germany

[21] Appl. No.: 289,189

[22] Filed: Aug. 11, 1994

Related U.S. Patent Documents

Reissue of:

[64] Patent No.: 5,138,859
Issued: Aug. 18, 1992
Appl. No.: 691,388
Filed: Apr. 25, 1991

[30] Foreign Application Priority Data

Jun. 15, 1990 [EP] European Pat. Off. ..... 90111303

[51] Int. Cl.[6] ..... B21K 1/08

[52] U.S. Cl. ..... 72/110

[58] Field of Search ..... 29/6.01; 72/107, 72/109, 110

[56] References Cited

U.S. PATENT DOCUMENTS

| | | | |
|---|---|---|---|
| 4,290,238 | 9/1981 | Judge, Jr. | 51/58 |
| 4,485,537 | 12/1984 | Berstein et al. | 29/6 |
| 4,559,798 | 12/1985 | Hayashi et al. | 72/110 |
| 4,766,753 | 8/1988 | Berstein et al. | 72/110 |

FOREIGN PATENT DOCUMENTS 0167659 1/1986 European Pat. Off. .

OTHER PUBLICATIONS

Hegenscheidt Corp. Drawings: 85-E-10820, 85-E-10821, 85-E-10822.

*Primary Examiner*—Lowell A. Larson
*Attorney, Agent, or Firm*—Reising, Ethington, Barnard & Perry

[57] ABSTRACT

A method and apparatus for smooth-rolling and deep-rolling the journal pins of multi-crank crankshafts divides the crank pins into two groups, each including alternating crank pins, since the space between neighboring crank pins is insufficient for simultaneously rolling all of the pins including the main bearing pins in one operation. Each group of crank pins is then rolled separately in succession, whereby one group includes the main bearing pins. Thus, a crankshaft, including any number of closely spaced crank pins, can be completely machined in two rolling operations. In order to carry out this method a rolling apparatus includes crank pin rolling devices for each of the pins of one group. The rolling devices are axially slideably adjustable in unison between two determinable positions in which they may be fixed or locked after adjustment. The crank pin rolling devices are spaced from one another with a sufficient spacing in the axial sliding direction so that at least one crank pin can pass between two adjacent crank pin rolling devices.

23 Claims, 4 Drawing Sheets

METHOD AND APPARATUS FOR SMOOTH-ROLLING AND DEEP-ROLLING MULTI-STROKE CRANKSHAFTS

Matter enclosed in heavy brackets [ ] appears in the original patent but forms no part of this reissue specification; matter printed in italics indicates the additions made by reissue.

FIELD OF THE INVENTION

The invention relates to a method of smooth-rolling and deep-rolling a workpiece., the crank of multi-crank or multi-stroke crankshafts. The invention also relates to an apparatus for carrying out the present method.

BACKGROUND INFORMATION

Methods of smooth-rolling and deep-rolling the bearing pins of multi-crank or multi-stroke crankshafts are generally known. In this context the deep-rolling operation is frequently limited to the area of the transition radius or gusset between the bearing pin and the crank web or check. It is a predominant goal in this field to simultaneously roll all of the bearing pins, including the main bearing pins and all of the connecting rod crank pins. Such a method is most economical as long as large numbers of the same type of crankshafts are being manufactured. The economy is achieved because the crankshaft is completely machined in a single work operation. The original machines built to achieve this goal were specific application machines built for a single exactly defined crankshaft type having one specified set of dimensions. Unfortunately, such machines and the methods they employed were quite uneconomical when various different crankshaft types, namely crankshafts having different dimensions, were to be pranced and rolled in low number production runs. In those cases it would be necessary to build a separate rolling machine for each different crankshaft type. European Patent Publication No. 0,167,659 discloses adjustable crankshaft rolling machines which overcome the above described problem, but which are not able to simultaneously roll all of the bearing pins. However, thee machines could easily adjusted to various crankshaft dimensions and would then be used to successively roll the various bearing pins of each crankshaft. U.S. Pat. No. 4,290,238 discloses a similar apparatus. However, these two machines are very slow and thus uneconomical in machining the crankshafts.

In all of the above described prior art machines the bearing pin rolling devices are arranged respectively next to rich other in such a manner that two directly neighboring bearing pins may be rolled simultaneously in one-rolling operation. However, this method and arrangement of the rolling tools of the rolling devices is not possible for crankshafts with extremely closely spaced connecting rod crank pins because there is not sufficient space for arranging the rolling device directly next to each other. In such cases it is only possible to use a single rolling device to individually roll each connecting rod crank pin respectively in succession. The rolling process thereby becomes slow and uneconomical even for a series production of a relatively small number production run.

OBJECTS OF THE INVENTION

In view of the above, it is the aim of the invention to achieve the following objects singly or in combination: to provide a method for smooth-rolling and deep-rolling crankshaft being pins quickly and economically with a minimum number of rolling operations even when the bearing pins are located extremely closely together;

to provide an apparatus for carrying out such a method, whereby the apparatus must be capable of smooth-rolling and deep-rolling crankshafts of different dimensions; and to enable such an apparatus to fully automatically carry out a complete rolling operation on a crankshaft.

SUMMARY OF THE INVENTION

The above objects have been achieved by a method for smooth-rolling and roll-hardening or rather deep-rolling a crankshaft according to the invention, wherein all of the connecting rod crank pins of a crankshaft are divided i.e., into two group wherein first the crank pins of one group are rolled and then the crank pins of the other group are rolled. Each group includes alternating connecting rod crank pins, which are not directly neighboring each other. In this manner only two rolling operations must be carried out, even if a substantial number of individual connecting rod crank pins are to be rolled. Because of the alternating arrangement to form each group, sufficient room is provided for arranging the rolling devices. Thus, the alternating arrangement of connecting rod crank pins into two groups makes it possible to locate the rolling devices next to each other and to roll all pins of the same group together or simultaneously. Further it is possible during the rolling of one group of connecting rod crank pins in a first operation, simultaneous to roll or merely one group of the bearing pins as well, so that the additional rolling of the main bearing pins does not require additional time or additional working operations.

The apparatus according to the invention for performing the present method is a crankshaft deep- and smooth-rolling machine, including a machine frame and means for receiving and rotationally driving at least one multi-throw or multi-stroke crankshaft about a rotational axis. The apparatus further includes main bearing pin rolling devices carrying rolling tools and at least two connecting rod crank pin rolling devices carrying rolling tools which are suspended to operate as a pendulum in a plane perpendicular to the rotational axis of the work piece, from a carriage for a radial sliding adjustment and a radial positioning adjustment. According to the invention the connecting rod crank pin rolling devices are axially slideable together or in common between two preadjusted or preadjustable positions in which they may be fixed or locked. In this arrangement the connecting rod crank pin rolling devices are spaced from one another in the adjustment sliding direction at such a distance that at least one connecting rod crank pin fits into the space between two neighboring connecting rod crank pin rolling devices in their working position. With such an arrangement of the rolling devices, there is sufficient space to arrange the connecting rod crank pin rolling devices next to one another for at least one of the groups of crank pins to be rolled. After completing a tint rolling operation on a first group of connecting rod crank pins, a simple sliding adjustment of the rolling device arrangement allows the second group of connecting rod crank pins to be rolled, thereby completing the entire rolling process. Simple carriages may be used to permit the sliding adjustment of the rolling device arrangement in which the rolling devices assume a rigid position relative to one another at least during the sliding adjustment. Only two different positions must be assumed by the adjustment carriage. Thus, these two positions may be simply determined by appropriately arranging stops or limit blocks. These stops may also be adjustably arranged. After the carriage is driven into each respective working position, the carriage may be held in the working position, for example, by a clamping mechanism or by driving the carriage against the stop with the position adjustment drive means. The sliding of the carriages into the two different working positions may be power driven. The radial sliding adjustment of the connecting rod crank pin rolling devices may be carried out individually for each device or may be carried out simultaneously and in common for all devices. In the first instance, a separate drive must be provided for each individually adjustable device. In the second instance a single drive suffices for all devices.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
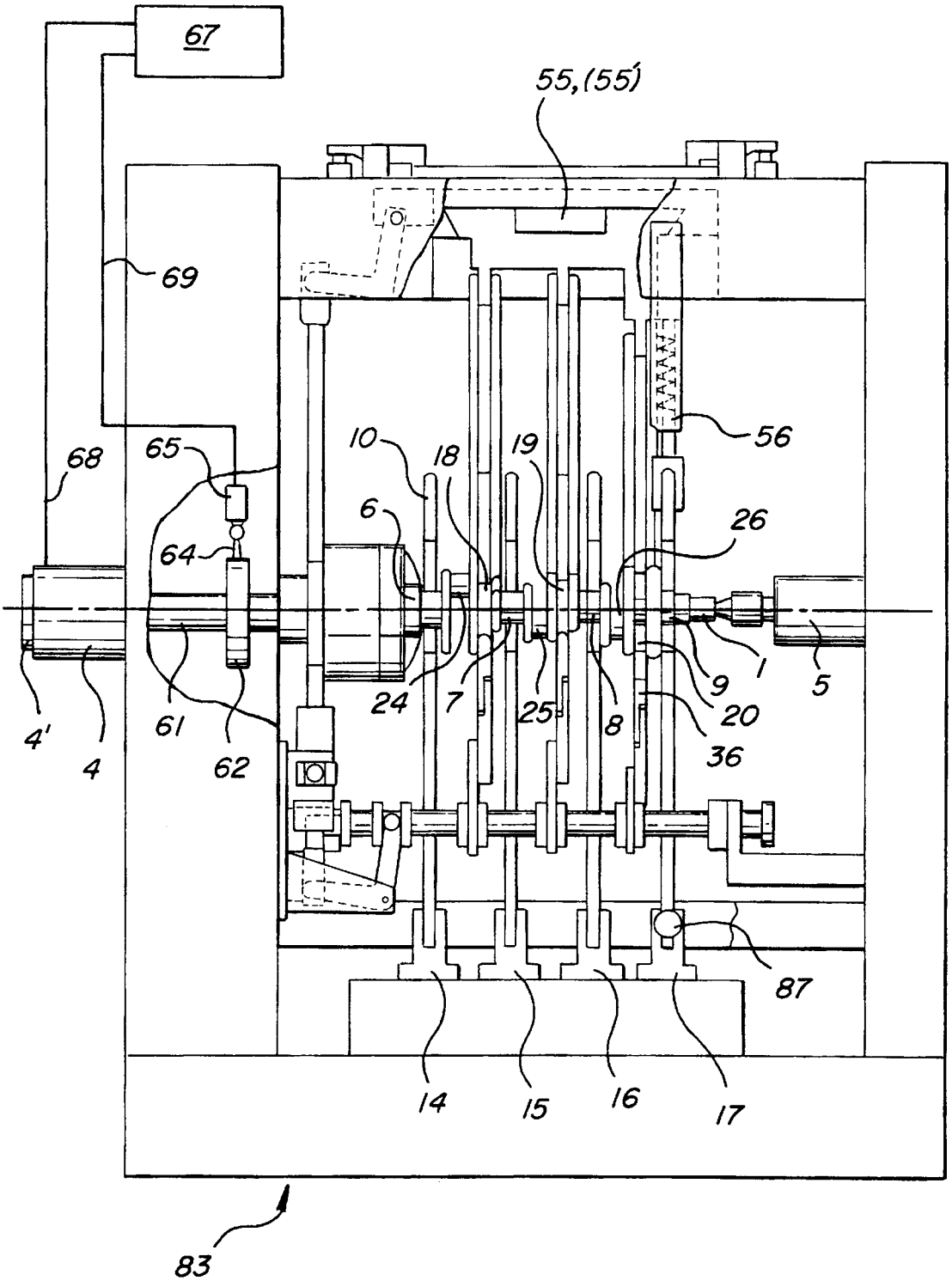
FIGS. 1, 1A are front schematic views of an apparatus according to the invention for smooth-rolling and deep-rolling a crankshaft.
Figure 1A:
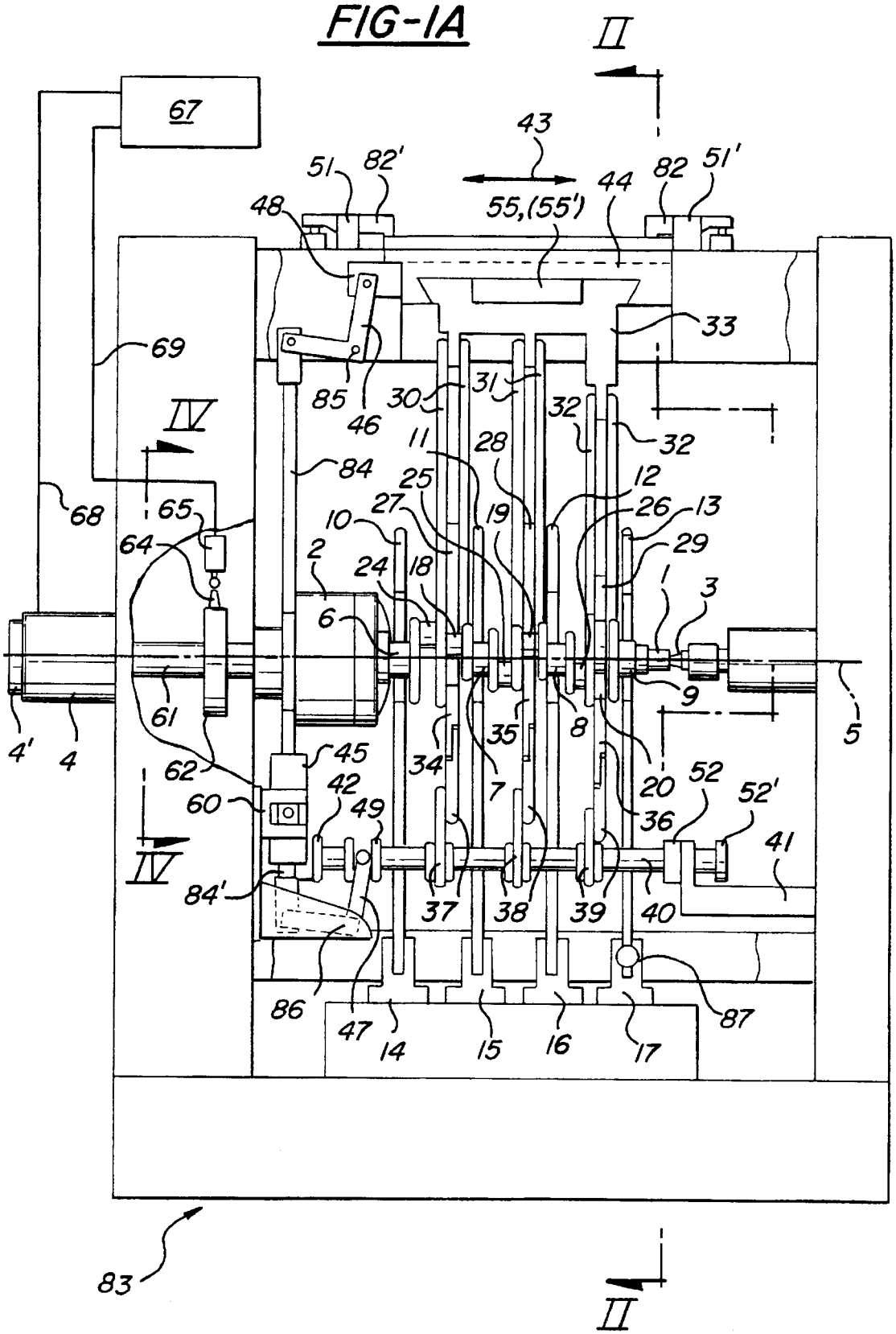

As shown in FIGS. 1, and 1A a crankshaft 1 is mounted and at one end by means of a chuck 2 and at the other end by a dead-center point 3, whereby the crankshaft can be rotationally driven in a machine frame 83. A drive motor 4 drives the chuck 2 and thus the crankshaft 1 which rotates about its rotational axis 5. The crankshaft 1 includes main bearing pins 6, 7, 8, and 9. Main bearing pin rolling devices 10, 11, 12, and 13 rest with their rolling tools which are not shown in detail in FIGS. 1 and 1A against the main bearing pins 6, 7, 8, and 9 respectively. The construction and operation of such rolling tools are known in the art and therefore require no further description. The main bearing pin rolling devices 10, 11, 12, and 13 are arranged to extend with their main extension direction essentially vertically. The main bearing pin rolling devices 10, 11, 12, and 13 are movably received at their lower ends in bearing brackets 14, 15, 16, and 17, comprising spring bearings of which only the spring bearing 87 of the bearing bracket 17 is shown. Each of the upper ends of the main bearing rolling devices 10, 11, 12, and 13 is similarly movably mounted in a spring bearing of which only the upper spring bearing 56 receiving the main bearing rolling device 13 is shown. The rolling devices 10, 11, 12, and 13 are movably held in this manner to compensate any tolerance variations.

The crankshaft 1 comprises a first group or connecting rod crank pins 18, 19, and 20 which are contacted by the crank pin rolling devices 21, 22, and 23 respectively. Each pin rolling device comprises an upper arm 27, 28, and 29 respectively and a lower arm 34, 35, and 36 respectively. The crank shaft 1 comprises a second group of connecting rod crank pins 24, 25, and 26 which are not contacted by rolling devices during the operation shown in FIGS. 1 nd 1A. The crank pin rolling devices 21, 22, and 23 are arranged with their main extension directed essentially horizontally so that the crank pin rolling devices 21 22, and 23 are arranged at an angle relative to the main bearing pin rolling devices 10, 11 and 12, 13 while forming respective planes extending perpendicularly to the rotation axis 5 of the crankshaft 1. In this manner it is achieved that the main bearing pin rolling devices 10, 11, 12, and 13 and the crank pin rolling devices 21, 22, and 23 may be arranged close together with little space between adjacent rolling devices.

Figure 2:
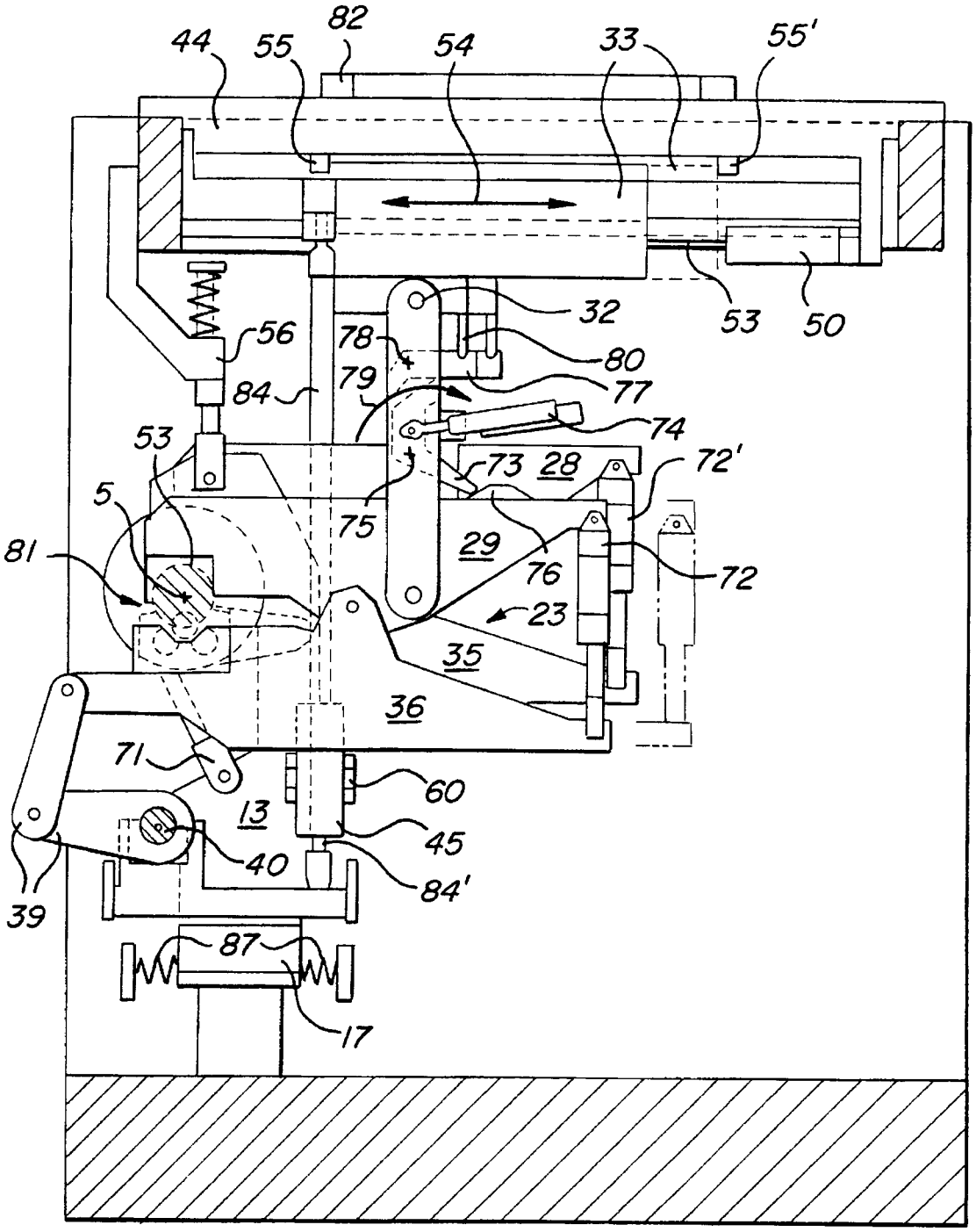
FIG. 2 is a cross-section along the line II—II in FIG. IA.

As further shown in FIG. 1A and in a side view in FIG. 2, upper or first arms 27, 28, and 29 of the crank pin rolling devices 21, 22, and 23 are hingeably mounted by levers 30, 31, and 32 which pivot or journal the crank pin rolling devices 21, 22, by a lengthwise carriage 44. The lower or second arms 34, 35, and 36 of the crank pin rolling devices 21, 22, and 23 are connected by means of articulated support means 37, 38; and 39, respectively to a support shaft 40 which is mounted in an axially movable manner in bearing blocks 41 and 42 as shown especially in FIG. 1A.

The support shaft 40 and the lengthwise carriage 44 are synchronously driven in the direction of arrow 43 shown in FIG. 1A parallel to the rotation axis 5 by means of a pressure cylinder 45 comprising dual piston rods 84 and 84'. The pressure cylinder 45 is pivotally, but nonslideably held in forks 60 and drives the support shaft 40 and the lengthwise carriage 44 through the piston rods 84 and 84' and through angled bellcrank levers 46 and 47 attached to respective outward ends of the piston rods 84 and 84'. At their other free ends, the bellcrank levers 46 and 47 engage crank sliders 48 and 49 attached to the lengthwise carriage 44 and to the support shaft 40, respectively. Each bellcrank lever 46 and 47 is pivotally supported in a location fixed manner at a respective pivot point 85 and 86 near the area of the elbow bend of each lever.

Other drive arrangements could be used to provide a synchronous sliding drive of the carriage 44 and the support shaft 40. For example, the pressure cylinder 45 comprising dual piston rods could be replaced by an electric motor driving an axially fixed, but rotational threaded nut on a threaded shaft or spindle, whereby the threaded shaft would then be driven axially to perform the same function as the dual piston rods 84, 84' in the depicted embodiment. As another alternative drive arrangement, individual drives could be provided for the carriage 44 and the support shaft 40, whereby the individual drives would be controlled to operate in synchronism.

As shown especially in FIG. 2, the crosswise carriage 33 carrying the upper arms 27, 28, 29 of each respective crank pin rolling device 21, 22, and 23 through the levers 30, 31, and 32, is driven in the direction 54 perpendicular to the rotation axis 5 by means of the pressure cylinder 50 which is attached at one end to the lengthwise carriage 44 and to the crosswise carriage 33 by its piston rod 53. As an alternative to this single combined drive for all crank pin rolling devices, a separate individual drive could be provided for each rolling device so that each individual rolling device could be slideably driven independently of the other devices and at different times. Individual drives could be driven in synchronism, if desired.

The extent of the lengthwise motion of the lengthwise carriage 44 in the direction of arrow 43 shown in FIG. 1A and thus the axial position of the crank pin rolling devices is determined by the stops 51 and 51'. Simultaneously, the lengthwise motion of support shaft 40 is limited by stops 52 and 52'. The extent of the crosswise motion of cross carriage 33 in the direction of arrow 54 as shown in FIG. 2 and thus the position of the crank pin rolling devices perpendicular to the rotational axis 5 is limited or determined by stops 55 and 55'.

Figure 3:
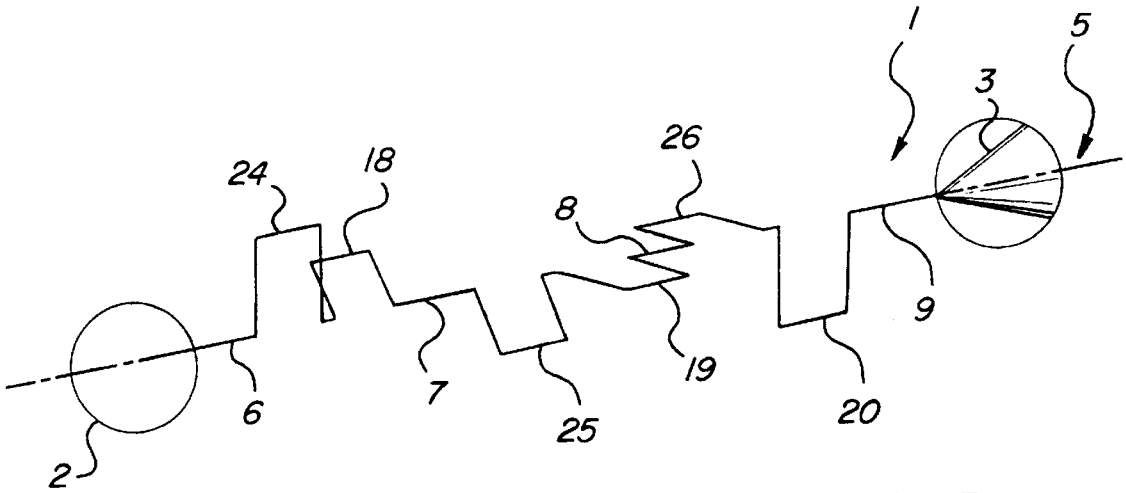
FIG. 3 is a simplified or stylized three-dimensional perspective view of a crankshaft to be operated on in the apparatus shown in FIGS. 1, 1A.

FIG. 3 shows a simplified schematic illustration of a crankshaft 1 seen from the left front side of FIG. 1A with the crankshaft 1 supported at one end in the chuck 2 and at the other end on the dead-center point 3. The crankshaft 1 comprises main bearing pins 6, 7, 8, and 9, a first group of connecting rod crank pins 18, 19, and 20, and a second group of connecting rod crank pins 24, 25, and 26.

In a first rolling operation of the crankshaft 1 the appropriate corresponding rolling devices are brought into contact with all of the main bearing pins 6, 7, 8, and 9, and with the first group of crank pins 18, 19, and 20. Each of the crank pins 18, 19, and 20 is spared around the circumference of the crankshaft 1 by an angle of 120° from the other first group of crank pins 18, 19, and 20, but are displaced by 60° from the neighboring crank pins of the second group of crank pins 24, 25, and 26, so that each crank pin is spaced by 60° from its neighboring crank pin.

The crank pin rolling devices 21, 22, and 23 comprising essentially known rolling tools which are not shown in detail, are supported in such a manner that during rolling the connecting rod crank pins 18, 19, and 20 and then the crank pins 24, 25, and 26, and the rolling tools can follow the path of the respective connecting rod crank pin on a circular path 63 about rotation axis 5 as the crankshaft 1 is rotated.

Figure 4:
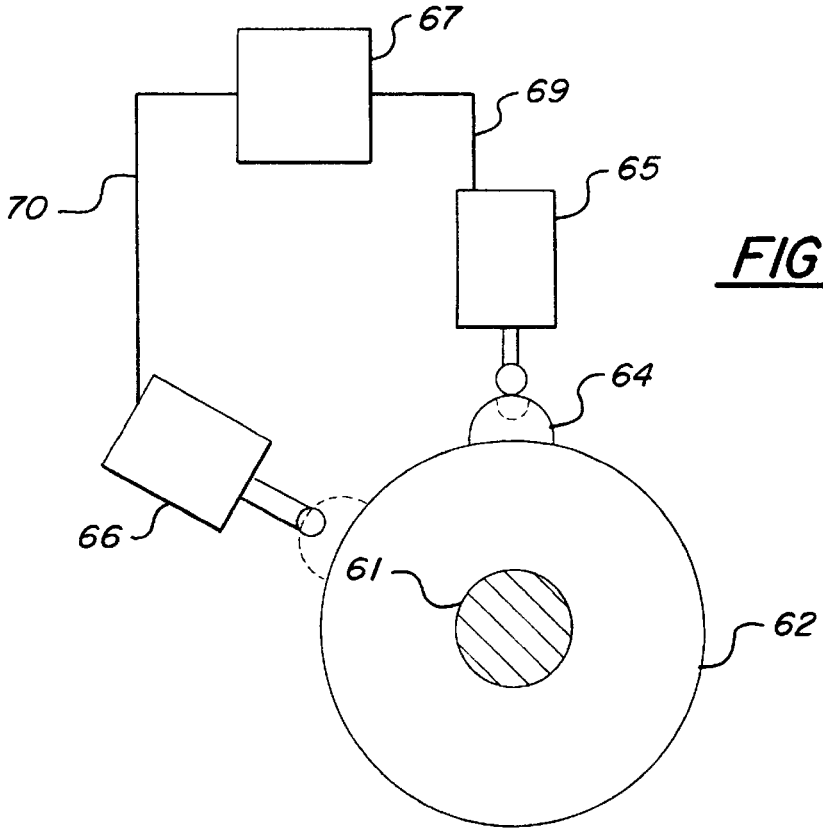
FIG. 4 is a view partially in section taken along line IV—IV of FIG. 1A, on an enlarged scale compared to FIG. 1.

In loading a crankshaft 1 into, or unloading a crankshaft 1 from, the rolling apparatus according to the invention, the crankshaft I is always in the same defined position, so that the crank parts 18, 19, and 20 are also in respective defined positions at the time of loading and unloading. The crank pin rolling devices 21, 22, and 23 are aligned to be in a position in accordance with the defined position of the crank pins 18, 19, and 20. For this reason it is necessary to rotate the crankshaft 1 into a proper position determined by the alignment of the rolling devices in order to start the second rolling operation during which the connecting rod crank pins 24, 25, and 26 are to be rolled. Stated differently, the crankshaft 1 is rotated so that the connecting rod crank pins 24, 25, and 26 take up the rotational positions originally occupied by the connecting rod crank pins 18, 19, and 20. More specifically, the crank pin 24 is moved into the initial rotational position of crank pin 18, crank pin 25 is moved into the initial rotational position of crank pin 19, and crank pin 26 is moved into the initial rotational position of crank pin 20. For this purpose a cam disk 62 is arranged on a shaft 61 between a drive motor 4 and the chuck 2 to facilitate the repositioning rotation of the crankshaft 1 between the two rolling operations. The cam disk 62 is fixed to the shaft 61 to rotate with the shaft 61. As shown especially in FIG. 4, the cam disk 62 is equipped with a cam 64 cooperating with a limit switch 65 which defines the initial position of the chuck 2 and thus of the crankshaft 1 during loading and unloading and at the beginning of the first rolling operation. A further limit switch 66 shown in FIG. 4 defines a second rotational position of the crank shaft 1. The limit switch 66 is arranged on the circumference of the cam disk 62 in such a way that the switch 66 can be operated by a cam 64. During the course of a work sequence, the limit switches 65 and 66 are activated by the machine control 67 as required. The control 67 may be a CNC control, for example. The drive motor 4 which drives or rotates the chuck 2, and the limit switches 65 and 66 are connected respectively by electrical conductors 68, 69, and 70 to the machine control 67 as shown in FIG. 4 and FIGS. 1 and 1A.

As an alternative to the cam disk 62 with its cam 64 and the limit switches 65 and 66, an angle transducer may be used for monitoring and controlling the angular position of the crankshaft 1.

As shown in FIG. 2, the rolling force of the main bearing pin rolling device 13 and its opening and closing motion are applied by means of the rolling force cylinder 71. The remaining main bearing rolling devices 10, 11, and 12 shown in FIG. 1A are connected to similar rolling force cylinders, not shown. Referring again to FIG. 2, the rolling force and the force for the opening and closing motions of the crank pin rolling device 23 are applied by means of a rolling force cylinder 72. The crank pin rolling devices 21 and 22 shown in FIG. 1 are each connected to similar rolling force cylinders not shown since showing one such device at 72 is sufficient.

When the crank pin rolling devices 21, 22, and 23 are rolling the connecting rod crank pins, these crank pin rolling devices must be carried along by the rotating motion of the respective crank pins as the crankshaft 1 rotates. To enable such a circular motion of the crank pin rolling devices 21, 22, and 23, these devices are suspended to be freely movable in a plane perpendicular to the rotation axis 5. While inserting or removing a crankshaft from the rolling apparatus and also while shifting the crank pin rolling devices 21, 22, and 23 from a first rolling position engaging crank pins 18, 19, and 20, to a second rolling position engaging crank pins 24, 25, and 26, it is necessary that the crank pin rolling devices 21, 22, and 23 are feed in a basic initial position. FIG. 2 shows the crank pin rolling device 23 fixed in such an initial position, wherein the crank pin rolling device 23 is fixed by means of the lever 73 which is pivoted in the direction 79 about the journal point, or rather axis 75, by means of the pressure piston cylinder device 74. The lever 73 supports the crank pin rolling device 23 against cam 76 and simultaneously thereby pivots lever 77 about the journal point or axis 78 to become engaged with the strut 80.

While in this fixed position the crank pin rolling device 23 may also be opened and closed by means of the rolling force cylinder 72. The crank pin rolling devices 21 and 22, which are not shown in FIG. 2, are opened and closed in the same manner. In order to release this fixed position, the piston cylinder device 74 is supplied with pressure medium in such a manner that lever 73 is driven in a direction opposite to that of arrow 79, whereby cam 76 is released and simultaneously lever 77 is separated from the strut 80. However, this fixed position may only be released when the respective crank pin rolling device is brought into full contact with its respective bearing pin surface of the crankshaft 1.

A typical rolling operation on a crankshaft is carried out follows. At the start, as shown in FIG. 1A, the crank pin rolling devices 21, 22, and 23 are located in a right-most lengthwise position, the lengthwise carriage 44 contacts the right stop block 51', and the stop 52 of the support shaft 40 rests against the bearing block 41. The lengthwise carriage 44 is held in this position by the clamping means 82 and 82'. Also, as shown by dash-dotted lines in FIG. 2, the crosswise carriage 33 is driven toward the right in FIG. 2 away from the rotation axis 5 and rests against the stop 55' while the crank pin rolling devices 21, 22, and 23 have been fixed in the above described initial position by operating the pressure cylinder 74 and the other pressure cylinders not shown in FIG. 2. Thus, as shown in the example in FIG. 1A, with a sixth-crank crankshaft I the crank pin rolling devices 21 and 22 are arranged to contact the crank pins 18 and 19 lying above the rotation axis and the crank pin rolling device 23 is arranged to contact the crank pin 20 located below the rotation axis in this initial position. For this purpose the crank pin rolling device 23 is suspended at a correspondingly lower level than the two other crank pin rolling devices 21 and 22 as shown, for example, in FIG. 1A. Due to this arrangement the crank pin rolling devices may be held to extend in an essentially horizontal position as shown in FIG. 2, and may simply he shifted back and forth in the direction of arrow 54 substantially radially toward and away from the crankshaft 1, without requiring any pivoting or tilting motion in order to move from the contact position shown in FIG. 2 to the release or removal position shown by dash-dotted lines in FIG. 2.

At the start, the main bearing rolling devices 10, 11, 12, and 13 and the crank pin rolling devices 21, 22, and 23 are open at their rolling tool end 81 and the rotation axis 5 is completely free and clear. The cam disk 62 on the shaft 61 is positioned by the drive motor 4 so that the cam 64 operates the now actuated limit switch 65, whereby the defined loading position of the machine is established. A crankshaft 1 is inserted into the rolling apparatus according to the invention by a loading apparatus not shown, which places the crankshaft into the position shown in FIG. 1A so that the crankshaft 1 is received between the chuck 2 and the dead-center point 3. Next, the cross-carriage 33 is driven by the pressure piston cylinder device 50 against the stop 55 so that the crank pin rolling devices 21, 22, and 23 move with their rolling tools into the working position. The rolling tools of the main bearing rolling devices and the crank pin rolling devices are then moved with a slight force into contact with the main bearing pins 6, 7, 8, and 9 and with the connecting rod crank pins 18, 19, and 20, respectively. Simultaneously, the fixed position of the crank pin rolling devices is released as described above so that all the crank pin rolling devices are freely movable and so that they may be freely entrained for rotation about the main axis 5 as the crankshaft 1 rotates. Simultaneously, the drive motor 4 drives the chuck 2 to rotate the crankshaft 1 about the rotation axis 5. While the crankshaft 1 is rotating, the machine control 67 counts a predetermined number of revolutions of the crankshaft during which the contact force of the rolling devices is increased to the required rolling force for the specific rolling operation being carried out by means of respectively controlling the pressure piston cylinder devices 71 and 72 and the other pressure cylinders which are not shown, but which function in the same way as the piston cylinder devices 71, 72.

After a predetermined number of crankshaft revolutions during which the full rolling force has been applied to the rotating crankshaft, the rolling force is reduced at all rolling devices to the minimum contact force while the crankshaft is still rotating. Then, the rotation of the crankshaft 1 is stopped by stopping the drive motor 4 when the crankshaft 1 is again in its initial loading position. This loading position is achieved upon stopping the rotation in that the cam 64 activates the limit switch 65 which has been activated to control the shutting off of the drive motor 4 and the application of a brake 4'.

Thus, after the completion of the first rolling operation, the crankshaft 1 has been rolled on all of the main bearing pins and three of the crank pins making up the first group of crank pins 18, 19, and 20. The second group of crank pins 24, 25, and 26 must be rolled in a second rolling operation. For this purpose, the crank pin rolling devices 21, 22, and 23 are now fred in their positions as described above by means of the pressure piston cylinder device 74 and respective other pressure cylinders not shown. The respective upper arms 27, 28, and 29 and lower arms 34, 35, and 36 of the rolling devices 21, 22, and 23 are opened at the tool end 81 by means of the rolling force piston cylinder device 72, and by the other rolling force cylinders 72' and by one further cylinder not shown. Then, the cross-carriage 33 is pulled against the stop 55' by means of the pressure piston cylinder device 50. In this manner, the crank pin rolling devices 21, 22, and 23 have released and freed the crankshaft 1. Then, the clamping device 82, 82' of the lengthwise carriage 44 is released and the pressure cylinder 45 is actuated to drive the lengthwise carriage 44 and the support shaft 40 by the bell crank levers 46, 47 in the direction of arrow 43 against the stop 51, whereby stop 52' moves against the bearing bracket 41. Then, the clamping device 82 and 82' is again activated. Now, the crank pin rolling devices 21, 22 and 23 are located in a cross or alignment plane with the second group of crank pins 24, 25 and 26. The crankshaft 1 must be rotated so that the crank pins 24, 25, and 26 move into the above described angular positions corresponding to the angular position of the first group of crank pins 18, 19, and 20 and corresponding to the relative positions of the crank pin rolling devices 21, 22, and 23. For this purpose, the limit switch 66 is activated and the drive motor 4 is switched on by the machine control 67. As the cam disk 63 rotates the cam 64 contacts the limit switch 66 which shuts off the drive motor 4 and activates the brake 4'. Now, the crankshaft 1 is positioned in the necessary rotational or angular position. Then, the pressure cylinder 50 is activated to drive the cross-carriage 33 to the left in FIG. 2 against the stop 55 so as to move the crank pin rolling devices 21, 22, and 23 into position for carrying out the second rolling operation. The rolling force cylinders 72 close the tool end 81 of the crank pin rolling devices 21, 22, and 23 so that the respective rolling tools contact the crank pins 24, 25, and 26 with a minimum contact pressure. The main bearing pin rolling devices 10, 11, 12, and 13 are not brought into contact with the main bearing pins 6, 7, 8, and 9 in this second rolling operation because the main bearing pins have been completely machined during the first rolling operation. However, it would also be possible to carry out only a partial rolling of the main bearing pins during the first rolling operation and complete the necessary rolling during a second rolling operation. As soon as the respective crank pin rolling devices come into contact with the crank pins, the position fixing of the crank pin rolling devices is released as described above and drive motor 4 is activated to rotate the crankshaft 1 about the rotation axis 5. While the crankshaft 1 rotates, the rolling force is increased from the initial low contact force to the required full rolling force during a certain number of revolutions of the crankshaft 1 by appropriately activating the rolling force cylinders 72. After carrying out a prescribed number of crankshaft revolutions while applying the full rolling force, the rolling force is then again reduced to the minimum contact force while the crankshaft 1 continues to rotate through a predetermined number of revolutions. Then, the crankshaft 1 is stopped when it is in a proper rotational position corresponding to the starting position of the second rolling operation through the action of the cam 64 contacting the limit switch 66 which has been activated so that is now provides the signal for shutting off the drive motor 4 and applying the brake 4'. The crank pin rolling devices 21, 22, and 23 are again fixed in their position as described above and the tool ends 81 of the rolling devices are again opened as described above. Simultaneously, the main bearing rolling devices 10, 11, 12, and 13 are opened. The cross-carriage 33 is pulled by the pressure piston cylinder device 50 against the stop 55' in order to withdraw the crank bearing rolling devices 21, 22, and 23 away from the crankshaft 1. Now, the crankshaft 1 is again rotated into the initial loading and unloading rotational or angular position by means of the drive motor 4 controlled by the action of cam 64 cooperating with limit switch 65. A loading and unloading apparatus, which is not shown, can then remove the completely machined or rolled crankshaft 1 and load a new crankshaft to be rolled. Before a new rolling operation begins on the new crankshaft the crank pin rolling devices 21, 22, and 23 must be driven back into the initial lengthwise position shown in FIG. 1A by the appropriate activation of the pressure piston cylinder device 45.

Although the invention has been described with referenee to specific example embodiments, it will be appreciated, that it is intended to cover all modifications and equivalents within the scope of the appended claims.

What I claim is:

1. A method for smooth-rolling and deep-rolling a plurality of pins, of a crankshaft *with a single pin rolling machine*, comprising the following steps:

a) dividing said plurality of pins to be rolled into at least two groups of pins, b) including in each said group non-neighboring pins so that pins of one group are spaced by pins of the other group and vice versa, c) rolling all of the pins of one group simultaneously in one rolling operation; and d) rolling successive groups of pins in successive rolling operations.

2. The method of claim 1, comprising a further step of dividing said pins into at least one further group of at least one pin, whereby each pin in said further group is a main bearing pin, and rolling all pins of at least one of said further group of pins together with one of the aforementioned two groups of pins.

3. The method of claim 1, wherein a tint group of main bearing pins is included in one group of pins including crank pins, and wherein another group of main bearing pins is included in another group of pins including crank pins.

4. The method of claim 1, further comprising moving rolling means from one rolling position into a successive rolling position after each successive rolling operation.

5. An apparatus for smooth-rolling and deep-rolling of a plurality of pins of a crankshaft, comprising frame means, means for rotatably holding said crankshaft, means for rotationally driving said crankshaft about a rotation axis, means for simultaneously rolling a group of non-neighboring pins, crosswise carriage means for pendulously carving said rolling means and for moving said rolling means in a direction substantially radially to said rotation axis, means for axially moving said rolling means in a direction parallel to said rotation axis, means for fixing an axial working position of said rolling means in any one of a plurality of working positions, and a spacing between neighboring rolling means in an axial direction, said spacing being sufficient for a pin of one pin group presently not being rolled to be positioned between two neighboring rolling means when said neighboring rolling means are rolling another group of pins.

6. The apparatus of claim 5, wherein said pins include crank pins of said crankshaft and wherein said means for simultaneously rolling a group of non-neighboring pins comprise roller means for rolling at least said crank pins.

7. The apparatus of clam 6, wherein said means for fixing an axial working position clamping means which are selectively operative on said axial moving means.

8. The apparatus of claim 5, wherein said axial working position fixing means comprise stp means.

9. The apparatus of claim 8, further comprising means for adjusting said stop means into determined positions.

10. The apparatus of claim 5, wherein said means for axially moving said rolling means comprise lengthwise carriage means which carry said crosswise carriage means.

11. The apparatus of claim 10, wherein said axial moving means comprise power-driven sliding means operatively connected to said lengthwise carriage means.

12. The apparatus of claim 11, wherein said power driven sliding means comprise a pressure piston cylinder device comprising a dual-ended piston rod.

13. The apparatus of claim 5, further comprising an axially slidable support shaft, wherein said rolling means comprise respective rolling tools, first mounting arms and second mounting arms, first journal means articulately hinging a respective first arm and second arm to each other, second journal means for articulately connecting said first arms to said crosswise carriage means, and third journal means articulately connecting said second arms to said axially slideable support shaft.

14. The apparatus of claim 13, further comprising common power-driven sliding means, said axially slideable support shaft and said axial moving means being operatively connected to said common power driven sliding means.

15. The apparatus of claim 14, wherein said power-driven sliding means comprise a pressure piston cylinder device having a dual-ended piston rod, cylinder bracket means for holding said piston cylinder device in an axially fixed manner, first and second bellcrank means each comprising pivot point means for mounting the respective bellcrank means, and first and second lever arms rigidly interconnected near said pivot point means, wherein said first arm of said first bellcrank means is articulately connected to said axially moving means, said first arm of said second bellcrank means is articulately connected to said support shaft, and said second arms of said first and second bellcrank means are each articulately connected with respective opposite ends of said dual-ended piston rod.

16. The apparatus of claim 5, wherein said rotational driving means comprise a drive motor for rotating said crankshaft and brake means for precisely stopping the rotation of said motor, rotational angle sensor means for sensing a respective rotational orientation of said crankshaft, and machine control means for monitoring a sensed rotational orientation of said crankshaft and for providing control signals to said motor and to said brake means for rotating and stopping said work piece in at least one prescribed rotational orientation.

17. The apparatus of claim 5, wherein said rolling means comprise a plurality of rolling devices, and means for mounting at least one rolling device of said rolling devices for movement in a crosswise direction substantially perpendicular to said rotation axis independently of other rolling devices.

*18. A method for rolling a plurality of pins of a crankshaft with a crankshaft rolling machine having a plurality of pin rolling devices, comprising the following steps:*

*a) dividing said plurality of pins to be rolled into at least two groups of pins;*

*b) including in each said group non-neighboring pins of the crankshaft so that pins of a first group are spaced by pins of a second group;*

*c) rolling at least some of the pins of a first of said groups in a first rolling operation with said plurality of pin rolling devices; and subsequently,*

*d) rolling at least some of the pins of the second group of pins in a second pin rolling operation with at least some said plurality of pin rolling devices that previously rolled the pins of the first of said groups.*

*19. A method for rolling a plurality of pins of a crankshaft with one set of laterally spaced pin rolling devices of a pin rolling machine, comprising the following steps:*

*a) dividing said plurality of pins to be rolled into at least two groups of pins;*

*b) including in each said group non-neighboring pins so that pins of one group are spaced by pins of the other group;*

*c) rolling all of the pins of one group in one rolling operation with said laterally spaced pin rolling devices;*

*d) relatively moving said crankshaft and said pin rolling means of said machine; and subsequently,*

*e) rolling a second group of pins in a subsequent and second rolling operation with at least some said laterally spaced pin rolling devices which previously rolled said first group of pins.*

*20. A method of rolling first and second groups of non-neighboring crank pins of a crankshaft using at least some of the same rolling devices of a pin rolling machine for rolling both groups of crank pins comprising the steps of:*

*a) engaging the crank pins of said first group with at least some of said rolling devices;*

*b) rotating said crankshaft about its axis of rotation in a first rolling operation while applying sufficient force to said pins in said first group through said rolling devices engaged therewith to roll said pins of said first group;*

*c) completing the rolling of said pins of said first group;*

*d)* releasing said first group of crank pins from said rolling devices;

*e) relatively shifting said crankshaft and said rolling devices longitudinally with respect to each other;*

*f) engaging the second of said group of crank pins with at least some of said rolling devices;*

*g) rotating said crankshaft about its axis of rotation in a second rolling operation while applying sufficient force to said second group of pins through said rolling devices engaged therewith to roll said second group of crank pins;*

*h) completing the rolling of said second group of crank pins; and*

*i) releasing said second group of crank pins from said rolling devices.*

*21. An apparatus for rolling first and second groups of non-neighboring pins of a crankshaft having a centralized rotational axis, comprising frame means, chuck means for holding said crankshaft so that it can be rotatably driven about said axis, motor means for rotationally driving said chuck means and said crankshaft about said rotational axis, neighboring rolling means for rolling the first group of non-neighboring pins of said crankshaft and for subsequently rolling the second group of non-neighboring pins of said crankshaft, support means for carrying said neighboring rolling means and for moving said neighboring rolling means in a radial direction with respect to said rotational axis so that said rolling means can roll the first group of pins in a first rolling operation, a drive for relatively moving said neighboring rolling means and said crankshaft with respect to one another in the direction of said rotational axis after said first rolling operation so that said rolling means can be operatively engaged with said second group of pins for a second rolling operation.*

*22. An apparatus for rolling first and second groups of crank pins of a crankshaft having a centralized rotational axis, comprising a frame, a crankshaft holding chuck, a motor for driving said chuck and said crankshaft about the rotational axis, crank pin rolling tools, support structure carrying said pin rolling tools and movable in a radial direction with respect to said rotational axis so that said rolling tools can roll the first group pins in a first rolling operation, a drive for relatively moving said crank pin rolling tools and said crankshaft with respect to one another in the direction of said rotational axis after said first rolling operation so that at least some of said crank pin rolling tools can roll the second group pins of said crankshaft in a second rolling operation.*

*23. An apparatus for separately rolling discrete groups of non-neighboring pins of a crankshaft at first and second working positions, said crankshaft having an axis of rotation, comprising a frame, a crankshaft holding and turning mechanism, mechanism for turning said crankshaft about said axis, neighboring crank pin rolling devices, a cross-wise carriage for carrying said rolling devices and for moving said rolling devices in a direction substantially radial to said axis, a drive arrangement for axially moving said crankshaft and said rolling devices relative to one another between said first and second working positions, said apparatus having a spacing between neighboring rolling devices in an axial direction to accommodate pins of a second group of non-neighboring pins when said neighboring rolling devices are rolling a first group of pins, and stop means operative with said drive arrangement to establish at least said second position in which said rolling devices roll said pins of said second group while at least some said first pins of a first group are disposed between said rolling devices.*

* * * * *

UNITED STATES PATENT AND TRADEMARK OFFICE

CERTIFICATE OF CORRECTION

PATENT NO. : Re. 35,519

DATED : May 27, 1997

INVENTOR(S) : Rudolf Winkens

It is certified that error appears in the above-identified patent and that said Letters Patent is hereby corrected as shown below:

Column 1, line 34, delete "pranced", insert --produced-- and line 42, delete "thee", insert --these--, and line 42, after "easily" insert --be--, and line 50, delete "rich", insert --each--, and line 56, delete "device", insert --devices--, and line 67, delete "being", insert --bearing--.

Column 2, line 56, delete "tint", insert --first--.

Column 4, line 16, after "38", delete ";" and insert --,--.

Column 5, line 12, delete "spared", insert --spaced--.

Column 6, line 60, delete "I", insert --1--.

Column 7, line 60, delete "fred", insert --fixed--.

UNITED STATES PATENT AND TRADEMARK OFFICE

CERTIFICATE OF CORRECTION

PATENT NO. : Re. 35,519

DATED : May 27, 1997

INVENTOR(S) : Rudolf Winkens

It is certified that error appears in the above-identified patent and that said Letters Patent is hereby corrected as shown below:

Column 9, line 43, delete "carving",insert --carrying--.

Column 9, line 59, after "position", insert --comprise--.

Column 9, line 62, delete "stp", insert --stop--.

Column 10, line 4, delete "power driven", and insert --power-driven--.

Column 11, lines 27-28 should be typed in italics: "*releasing said first group of crank pins from said rolling devices;*".

Signed and Sealed this

Twenty-third Day of December, 1997

Bruce Lehman

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO : Re 35,519
DATED : May 27, 1997
INVENTOR(S): Rudolf Winkens

It is certified that error appears in the above-identified patent and that said Letters Patent is hereby corrected as shown below:

Column 1, line 34,

"having different dimensions were to be produced and roller";

Column 1, line 42,

"However, these machines could easily be adjusted to various";

Column 1, line 50,

"each other in such a manner that two directly neighboring";

Column 1, line 56,

"the rolling devices directly next to each other. In such cases"; and

UNITED STATES PATENT AND TRADEMARK OFFICE

CERTIFICATE OF CORRECTION

PATENT NO : Re 35,519

DATED : May 27, 1997

INVENTOR(S) : Rudolf Winkens

It is certified that error appears in the above-identified patent and that said Letters Patent is hereby corrected as shown below:

Column 1, line 67,

"shaft bearing pins quickly and economically with a minimum".

Column 2, line 56,

"be rolled. After completing a first rolling operation on a first".

Column 4, line 16,

"means 37, 38, and 39, respectively to a support shaft 40".

Column 5, line 12,

"pins 18, 19, and 20 is spaced around the circumference of the".

Column 6, line 60,

"sixth-crank crankshaft 1 the crank pin rolling devices 21 and".

Column 7, line 60,

"are now fixed in their positions as described above by means".

UNITED STATES PATENT AND TRADEMARK OFFICE

CERTIFICATE OF CORRECTION

PATENT NO : Re 35,519

DATED : May 27, 1997

INVENTOR(S) : Rudolf Winkens

It is certified that error appears in the above-identified patent and that said Letters Patent is hereby corrected as shown below:

IN THE CLAIMS:

Column 9, line 43

"carrying said rolling means and for moving said rolling";

Column 9, line 59

"an axial working comprise clamping means which are selec-"; and

Column 9, line 62,

"position fixing means comprise stop means".

Column 10, line 4,

"12. The apparatus of claim 11, wherein said power-driven".

UNITED STATES PATENT AND TRADEMARK OFFICE

CERTIFICATE OF CORRECTION

PATENT NO. : Re 35,519
DATED : May 27, 1997
INVENTOR(S) : Rudolf Winkens

It is certified that error appears in the above-identified patent and that said Letters Patent is hereby corrected as shown below:

Column 11, lines 27-28

*"d)releasing said first group of crank pins from said rolling devices;".*

Signed and Sealed this

Tenth Day of October, 2000

*Attest:*

Q. TODD DICKINSON

*Attesting Officer*

*Director of Patents and Trademarks*